United States Patent Office

3,600,459
Patented Aug. 17, 1971

3,600,459
COATING COMPOSITIONS CONTAINING A POLYESTER COMPOSITION, AN EPOXY RESIN AND AN AMINOPLAST RESIN
Joseph A. Vasta, Woodbury, N.J., assignor to E. I. du Pont de Nemours and Company, Wilmington, Del.
No Drawing. Filed May 13, 1968, Ser. No. 728,773
Int. Cl. C08g 17/007
U.S. Cl. 260—834
9 Claims

ABSTRACT OF THE DISCLOSURE

Novel polyester compositions resulting from the esterification reaction of two or more dicarboxylic acids or anhydrides, a glycidyl ester, a glycol and a polyol selected from the group consisting of trimethylol ethane, trimethylol propane, glycerine and pentaerythritol are provided for use in formulating thermosetting coating compositions by blending the polyester compositions with an epoxyhydroxy polyether condensate and an aminoplast resin for ultimate use in coating industrial appliances.

BACKGROUND OF THE INVENTION (1) Field of the invention

This invention relates to novel polyester compositions resulting from the esterification reaction of two or more dicarboxylic acids or anhydrides, a glycidyl ester, a glycol and a polyol selected from the group consisting of trimethylol ethane, trimethylol propane, glycerine and pentaerythritol and to heat curable coating compositions formulated from such polyester compositions in combination with an epoxyhydroxy polyether condensate and an aminoplast resin.

(2) Discussion of the prior art

Polyester compositions used as film-forming ingredients in thermosetting coating compositions are known in the art. One reason for the rapid acceptance of polyester compositions for use in formulating protective coatings is the balance of physical properties, such as flexibility, hardness and stain, heat and corrosion resistance, which the polyester compositions impart to such coatings after application to industrial appliances. However, a disadvantage of the prior art polyester compositions is that they often have a rather limited compatibility with the common ingredients used in making film forming materials. In addition, thermosetting coating compositions formulated from these polyester compositions often have a relatively poor shelf stability before application and rather poor adhesion characteristics after application.

The ingredients used in preparing the novel polyester compositions of this invention, however, result in the formation of a coating composition having improved physical properties over conventional coatings used in appliances, paints and finishes. For example, thermosetting coating compositions formulated from the polyester compositions of this invention have an outstanding combination of both chemical and stain resistance, flexibility, hardness, solvent resistance and corrosion resistance after application and an excellent shelf stability before application.

SUMMARY OF THE INVENTION

The present invention provides polyester compositions resulting from the esterification reaction of:

(1) Maleic anhydride and one or more dicarboxylic acids selected from the group consisting of fumaric, itaconic, ortho-phthalic and isophthalic acids;

(2) A glycidyl ester of the formula

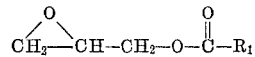

in which $R_1$ is a saturated aliphatic hydrocarbon radical having 5–17 carbon atoms or an ethylenically unsaturated hydrocarbon radical having 12–18 carbon atoms;

(3) Ethylene glycol, propylene glycol, 1,3-butane diol, 1,4-butane diol or neopentyl glycol; and (4) Trimethylol ethane, trimethylol propane, glycerine or pentaerythritol.

In formulating a coating composition from these polyester compositions, a solution of the polyester in a solvent is blended in the proportions of:

(1) 20 to 87 parts of the polyester composition;

(2) 3 to 30 parts of a water-insoluble epoxy-hydroxy polyether condensate having a plurality of vic-epoxy groups per molecule and at least one hydroxyl joined to an aliphatic carbon atom; and (3) 10 to 50 parts of at least one heat-curable aminoplast coating resin which is a condensate of formaldehyde with at least one member of the group consisting of melamine, benzoquanamine, melamine in combination with toluenesulfonamide, and urea, the condesate preferably being etherified with a saturated aliphatic monohydric alcohol, to provide a total of 100 parts of these film-forming materials which are compatibly in solution in a mutual solvent therefor. Pigment is dispersed in this solution in the proportion of up to about 150 parts per 100 parts of the organic film-forming material to provide a pigmented enamel composition.

The resultant coating compositions are hard and flexible, has a high adhesion to metal, and are stain, chemical and solvent resistant after application. In addition, the coating compositions exhibit a high degree of package stability.

In the preferred coating composition of this invention, the polyester composition contains a mixture of maleic and ortho-phthalic anhydrides, ethylene glycol, trimethylol propane and a glycidyl ester in which $R_1$ is a tertiary aliphatic hydrocarbon radical of 8–10 carbon atoms.

DESCRIPTION OF THE INVENTION

The parent polyester compositions of this invention can be prepared by carrying out the esterification reaction of:

(1) Maleic anhydride and one or more dicarboxylic acids selected from the group consisting of furmaric, itaconic, ortho-phthalic and isophthalic acids;

(2) A glycidyl ester of the formula

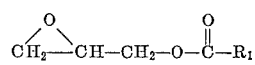

in which $R_1$ is a saturated aliphatic hydrocarbon radical having 5–17 carbon atoms or an ethylenically unsaturated hydrocarbon radical having 12–18 carbon atoms;

(3) Ethylene glycol, propylene glycol, 1,3-butane diol, 1,4-butane diol or neopentyl glycol; and (4) Trimethylol ethane, trimethylol propane, glycerine or pentaerythritol.

Although the maleic anhydride and dicarboxylic acid components as well as the glycidyl ester, glycol and polyol components of the parent polyester composition can be varied extensively, useful parent polyesters result from the esterification reaction of:

(1) About 4–15 percent, by equivalents, maleic anhydride and about 30–41 percent, by equivalents, of one or more dicarboxylic acids selected from fumaric, itaconic, ortho-phthalic and isophthalic acids;

(2) About 9–25 percent, by equivalents, of the glycidyl ester component;

(3) About 5-27 percent, by equivalents, of the glycol component; and (4) About 23-28 percent, by equivalents, of the polyol component.

The percent equivalents, based on 100 weight-equivalents of the reactants used in forming the polyester compositions, is understood to define weight equivalent as the weight of a substance equivalent to 1 gram-atom of hydrogen, 0.5 gram-atom of oxygen, or 1 gram-ion of hydroxyl ion.

Maleic anhydride is mixed with one or more dicarboxylic acids, such as itaconic, fumaric, ortho-phthalic or iso-phthalic acids, to form the anhydride constituent of the polyester compositions of this invention. The inclusion of maleic anhydride in the polyester compositions improves the combined heat resistance and high metal adhesion characteristics of the thermosetting coating compositions after application. In addition, the presence of maleic anhydride in the polyester improves the solubility of the parent polyester compositions in the solvents used in formulating coating compoistions.

As stated above, the glycidyl ester constituent of the polyester has the structural formula:

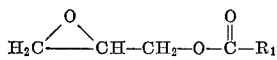

where $R_1$ is a saturated aliphatic hydrocarbon group containing 5-17 carbon atoms, or where $R_1$ is an ethylenically unsaturated aliphatic hydrocarbon radical of 12-18 carbon atoms. Particularly high quality coating compositions are formed when $R_1$ of the glycidyl ester component is a tertiary saturated aliphatic hydrocarbon group of the structure:

where $R_2$ is —$CH_3$ and $R_3$ and $R_4$ are alkyl groups having 1-12 carbon atoms. The mixed glycidyl ester manufactured and sold under the trade name "Cardura" E is particularly preferred in the practice of this invention because it imparts acid and alkali resistance to the final coating composition. "Cardura" E is a glycidyl ester of a synthetic tertiary carboxylic acid having the formula

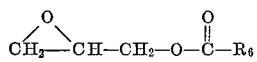

where $R_6$ is a tertiary aliphatic hydrocarbon group having 8-10 carbon atoms.

The glycidyl esters used in this invention can be made by reacting the sodium salt of the fatty acid with epichlorohydrin as follows:

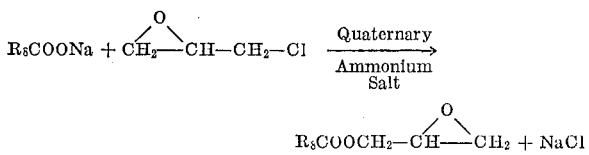

where $R_8$ is the aliphatic radical from the drying oil fatty acid. Such methods are taught, for example, in U.S. 3,178,451 to Drost and Kloss.

Typically suitable glycols used in the present invention include ethylene glycol, propylene glycol, 1,3-butane-diol, 1,4-butane diol, neopentyl glycol and their equivalents. The inclusion of ethylene glycol in the polyester composition is particularly preferred because of the increased stain resistance imparted to the finished coating composition.

Compounds suitable for use as the polyol component of the polyester resin include trimethylol ethane, trimethylol propane and glycerine. Pentaerythritol may also be made to function as the triol component when used in combination with a mole to mole blend of a glycol. Trimethylol propane is preferably used in the polyester compositions because it improves the aromatic solubility of the resin without adversely affecting the quality of the thermosetting coating compositions.

In order to formulate a coating composition from the parent polyester compositions having a balance of film quality after application and solubility in aromatic naphtha solvents before application, it is found desirable to carefully control the ratio of glycidyl ester to glycol in the polyester composition. Control of the glycidyl ester to glycol ratio also prevents premature gellation and aids in achieving the desired cure and hardness of the finished coating composition.

Preferably the ratio of glycidyl ester to glycol, expressed in weight equivalents of ester to weight equivalents of glycol, is about 0.25/1.00-2.25/1.00. For example, in a parent polyester formulation having 25.6 equivalents trimethylol propane, 7.4 equivalents maleic anhydride, and 37.0 equivalents ortho-phthalic anhydride, 16.7 equivalents of glycidyl ester and 13.3 equivalents of ethylene glycol, e.g. corresponding to a ratio of 1.25/1.00, are satisfactory amounts to achieve a resin formulation having the requisite properties. Likewise, a suitable polyester formulation resuts, for example, if 12.8 equivalents of glycidyl ester and 17.2 equivalents of glycol, e.g., corresponding to a ratio of approximately 0.75/1.00 are used.

The polyester compositions of this invention are particularly useful as film-forming ingredients in thermosetting coating compositions which are especially suited for finishing appliances such as refrigerators, washing machines, ranges and the like.

In formulating a coating composition from the parent polyester compositions, a solution of the polyester in a suitable solvent is blended in the proportions of:

(1) About 20-87 parts of the polyester;

(2) About 3-30 parts of a water-insoluble epoxyhydroxy polyether condensate; and (3) About 10-50 parts of at least one heat-curable aminoplast resin. The presence of the epoxyhydroxy polyether condensate in the formulated coating composition improves the shelf or package stability and retained adhesion characteristics, e.g., the adhesion properties of the coating after it is baked on a panel and subjected to impact and bending, of the coating composition.

Epoxyhydroxy polyether condensates suitable for use in the present invention have a plurality of vic-epoxy moieties, preferably about 2, plus at least 1 hydroxyl moiety per molecule. These epoxy condensates are the product of essentially condensing a polyhydric component with an epihalohydrin, e.g., epichlorohydrin. A particularly useful class of these condensates is the product of condensing a dihydric phenol, e.g., diphenylolpropane, with epichlorohydrin under alkaline conditions. These condensates are commercially available as "Epon" resins. Useful resins of this class can be prepared in accordance with well known methods such as disclosed in U.S. Pats. 2,503,726; 2,582,985; 2,592,560 and 2,694,694.

Preferred epoxy condensates are characterized by the general formula:

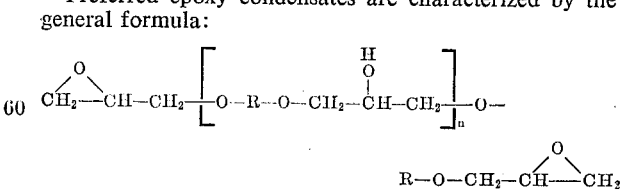

wherein $n$ is an integer having a value of at least 1 and usually ranging up to about 20 and the moiety

—O—R—O— is identified as

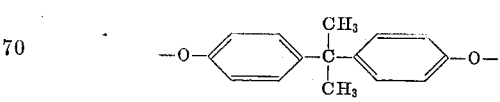

i.e., diphenylolpropane minus the hydrogen atoms of the phenolic hydroxyls. Thus, the preferred condensates contain 2 vic-epoxy moieties, i.e., 1,2-oxirane moieties, per molecule and at least one hydroxyl moiety joined to an aliphatic carbon atom. "Epon" 864, "Epon" 1001, "Epon" 1004, and "Epon" 1007 are typical useful, commercially available epoxy resins of this classification. In other useful epoxy condensates the radical —R— may be a monocyclic aromatic hydrocarbon radical or even an aliphatic hydrocarbon radical in lieu of the indicated bicyclic radical —R—.

Useful proportions of the vic-epoxy condensate usually range from 3 to 30 parts, preferably 5 to 20 parts, based on 100 parts by weight of the film-forming materials.

These epoxy condensates having a plurality of vic-epoxy moieties may be supplemented with ester products thereof such as described in U.S. 2,456,408 and with epoxidized oils such as prepared according to the teachings of U.S. 2,569,502. These supplemental epoxy materials, when present, usually constitute a minor proportion of the total content of epoxy components. It is desirable that at least 3 parts of epoxy condensate having at least two vic-epoxy materials per molecule be present per 100 parts of the film-forming materials.

Various amino-plast coating resins are suitable for use in formulating the coating compositions of this invention. Such useful amino-plast coating resins are commercially available and readily recognized by those skilled in the art of coating formulation. Useful aminoplast coating resins based on aminotriazines such as melamine and benzoguanamine can be prepared following the teachings of U.S. Pat. 2,197,357. Useful toluenesulfonamide-modified melamine/formaldehyde resins can be prepared following the teachings of U.S. 2,508,875. Useful alkanol-modified urea/formaldehyde resins can be prepared following the teachings of U.S. 2,191,957. While urea/formaldehyde coating resins can be used as the sole aminoplast component of the invention coating compositions for some purposes, use of this class of amino-plast is usually limited to no more than one-half the total content of the aminoplast because a proportion in excess of this amount ordinarily does not provide an adequate balance of properties in appliance coatings. Use of the urea/formaldehyde coating resins is limited preferably to combinations including the amino-triazine amino-plast coating resins. The toluene-sulfonamide-modified melamine - formaldehyde resin is particularly preferred as the amino-plast component. These coating resins are usually supplied at 40–70 percent concentration in solution in a lower alkanol or a mixture thereof with a high solvency hydrocarbon, xylol or toluol.

Useful proportions of the heat-curable amino-plast coating resin are within the range of 10–50 parts, preferably 15–30 parts, based on 100 parts by weight of the film-forming materials. Hexamethoxy methylol melamine, externally catalyzed with a strong mineral acid, such as para-toluene sulfonic acid, is particularly suitable for use in the present invention because it aids in the production of coating compositions having the requisite balance of properties.

The following examples illustrate the principles and practice of the present invention. All parts and percentages are by weight, unless otherwise specified.

EXAMPLE I

A mixture is prepared by mixing in a flask the following ingredients in the proportions given below:

| | Parts |
|---|---|
| Glycidyl ester ("Cardura" E) | 189 |
| Ethylene glycol | 49 |
| Xylol | 25 |
| Trimethylol propane | 107 |
| Maleic anhydride | 33 |

The resulting mixture is heated to approximately 100° C. to initiate an exothermic reaction. When the exotherm has subsided, 225 parts ortho-phthalic anhydride is added to the flask. Water is removed from the mixture by distillation until an acid number of 5 to 8 is obtained. The mixture is then cooled and subsequently diluted with 375 parts xylene. The resulting solution contains approximately 60 percent by weight polyester in xylene.

EXAMPLE II

A flexible one coat enamel is prepared for direct application to metal by premixing 33.33 parts of the polyester solution of Example I with 100 parts $TiO_2$ pigment, 16.6 parts xylol and 16.7 parts butanol. After direct agitation, the mixture is sand mill ground to a fineness of approximately 0.5 mil.

Then 83.34 parts of the polyester solution of Example I, 13.89 parts of a 72 percent solution of "Epon" 1001 in a 1 to 1 by weight mixture of Cellosolve/xylol solvents, 20 parts "Cymel" 301 hexamethoxy methylol melamine, 1.5 parts of a 20 percent solution of para-toluene sulfonic acid in butanol and 6.80 parts xylol are added to the sand mill ground mixture.

The resultant composition is diluted with xylol to a suitable hand application viscosity and applied directly to a metal substrate to obtain a dry film thickness of 1.5 mils. The film is then baked for 30 minutes at 150–160° C. to obtain a hard, flexible and stain, chemical, corrosion and heat resistant coating.

The coating has a pencil hardness of 2H to 4H and is resistant to mustard, lipstick and food dye stains. After 6 months of shelf aging no detectable change in the viscosity of the coating composition is observed.

EXAMPLE III

A primer which is highly resistant to heat, corrosion and grease is prepared by premixing 50 parts R–900 Rutile $TiO_2$ pigment, 50 parts ASP–200 hydrous aluminum silicate, 16.6 parts "Solvesso" 100 (aromatic naphtha, boiling point 160° C.) and 16.7 parts butanol. The resultant mixture is sand mill ground to a fineness of 0.7 mil.

Then 83.34 parts of the polyester solution of Example I, 13.89 parts "Epon" 1001 solution and 25 parts of a melamine-formaldehyde resin (80 percent solids in isopropanol) are added to the sand mill ground mixture.

The resultant primer is diluted with xylol to a suitable application viscosity and applied directly to the metal substrate to obtain a dry mill thickness of 0.7 to 1.0 mil. After baking the film for 30 minutes at 160–180° C., the enamels described in U.S. Pats. 3,312,646; 3,338,860; 3,330,814 and 3,366,706 are applied to the primer coat to obtain a coating system suitable for use in industrial applications.

In order to obtain comparable coating compositions of this invention, one can substitute any of the following components for ortho-phthalic anhydride, ethylene glycol, and trimethylol propane respectively:

| Ortho-phthalic Anhydride | Ethylene glycol | Trimethylol propane |
|---|---|---|
| Fumaric acid | Propylene glycol | Trimethylol ethane. |
| Itaconic acid | 1,3-butane diol | Glycerine. |
| Isophthalic acid | 1,4-butane diol neopentyl glycol. | Penterythol/glycol. |

What is claimed is:

1. A polyester composition comprising the reaction mixture: (a) of about 4–15 percent, by equivalents, of maleic anhydride and about 30–41 percent, by equivalents, of at least one dicarboxylic acid selected from the group consisting of ortho-phthalic acid and isophthalic acid; (b) about 9–25 percent, by equivalents, of a glycidyl ester having the formula

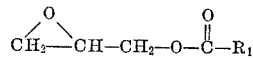

wherein $R_1$ is an alkyl radical having 5–17 carbon atoms or an ethylenically unsaturated aliphatic hydrocarbon radical having 12–18 carbon atoms; (c) about 5–27 percent, by equivalents, of a glycol selected from the group consisting of ethylene glycol, propylene glycol, 1,3-butane diol, 1,4-butane diol and neopentyl glycol; and (d) about 23–28 percent, by equivalents, of a polyol selected from the group consisting of trimethylol ethane, trimethylol propane, glycerine and pentaerythritol.

2. The polyester composition of claim 1 in which the ratio of equivalent weights of glycidyl ester and glycol is about 0.25/1.00–2.25/1.00.

3. The polyester resin of claim 2 in which the anhydride-dicarboxylic acid mixture is maleic anhydride and ortho-phthalic acid, the glycol is ethylene glycol, and the polyol is trimethylol propane.

4. A coating composition comprising: (A) about 20–87 percent, by weight, of a polyester composition which comprises:
   (1) about 4–15 percent, by equivalents, maleic anhydride and about 30–41 percent, by equivalents, of a dicarboxylic acid selected from the group consisting of ortho-phthalic acid and isophthalic acid;
   (2) about 9–25 percent, by equivalents, of a glycidyl ester having the formula

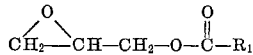

wherein $R_1$ is an alkyl radical having 5–17 carbon atoms or an ethylenically unsaturated aliphatic hydrocarbon radical having 12–18 carbon atoms;
   (3) about 5–27 percent, by equivalents, of a glycol selected from the group consisting of ethylene glycol, propylene glycol, 1,3-butane diol, 1,4-butane diol, and neopentyl glycol; and
   (4) about 23–28 percent, by equivalents, of a polyol selected from the group consisting of trimethylol ethane, trimethylol propane, glycerine and pentaerythritol;
(B) about 30–30 percent, by weight, of an epoxyhydroxy polyether condensate prepared by condensing an epichlorohydrin with a polyhydroxy compound; and (C) about 10–50 percent, by weight, of an aminoplast resin.

5. The coating composition of claim 4 in which the ratio of equivalent weights of glycidyl ester and glycol is about 0.25/1.00–2.25/1.00.

6. The coating composition of claim 5 in which the anhydride-dicarboxylic acid mixture is maleic anhydride and ortho-phthalic acid, the glycol is ethylene glycol, and the polyol is trimethylol propane.

7. The coating composition of claim 6 in which the aminoplast resin is hexamethoxy methylol melamine.

8. A method of preparing a shelf stable coating composition comprising (A) preparing a polyester composition heating until reacted:
   (1) about 4–15 percent, by equivalents, maleic anhydride and about 39–41 percent, by equivalents, of a dicarboxylic acid selected from the group consisting of ortho-phthalic acid and isophthalic acid;
   (2) about 9–25 percent, by equivalents, of a glycidyl ester having the formula

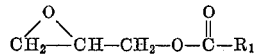

wherein $R_1$ is an alkyl radical having 5–17 carbon atoms or an ethylenically unsaturated aliphatic hydrocarbon radical having 12–18 carbon atoms;
   (3) about 5–27 percent, by equivalents, of a glycol selected from the group consisting of ethylene glycol, propylene glycol, 1,3-butane diol, 1,4-butane diol, and neopentyl glycol; and
   (4) about 23–28 percent, by equivalents, of a polyol selected from the group consisting of trimethylol ethane, trimethylol propane, glycerine and pentaerythritol;
(B) mixing with said polyester about 3–30 percent, by weight, of an epoxyhydroxypolyether condensate prepared by condensing an epichlorohydrin with a polyhydroxy compound; and (C) about 10–50 percent, by weight, of an aminoplast resin.

9. The method of claim 8 wherein the ratio of the equivalent weights of glycidyl ester and glycol is maintained between 0.25/1.00 and 2.25/1.00.

References Cited

UNITED STATES PATENTS

| | | | |
|---|---|---|---|
| 2,720,500 | 10/1955 | Cody | 260—75EP |
| 3,161,618 | 12/1964 | Kreps et al. | 260—75EP |
| 3,249,653 | 5/1966 | Van Amerongen et al. | 260—75EP |
| 3,268,483 | 8/1966 | Klootwijk et al. | 260—75EP |

FOREIGN PATENTS

| | | | |
|---|---|---|---|
| 569,634 | 1/1959 | Canada | 260—75EP |

JOHN C. BLEUTGE, Primary Examiner

U.S. Cl. X.R.

117—132, 161; 260—33.4, 39, 40, 75, 835, 850